(12) United States Patent
Lim et al.

(10) Patent No.: US 11,813,965 B2
(45) Date of Patent: Nov. 14, 2023

(54) MOVING AND LOCKING DEVICE FOR SEAT AND PERSONAL MOBILITY

(71) Applicants: HYUNDAI MOTOR COMPANY, Seoul (KR); KIA MOTORS CORPORATION, Seoul (KR)

(72) Inventors: Deok Soo Lim, Hwaseong-si (KR); Chan Ho Jung, Gunpo-si (KR); Sang Do Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 381 days.

(21) Appl. No.: 17/196,398

(22) Filed: Mar. 9, 2021

(65) Prior Publication Data
US 2022/0097568 A1 Mar. 31, 2022

(30) Foreign Application Priority Data
Sep. 28, 2020 (KR) ........................ 10-2020-0125472

(51) Int. Cl.
*B60N 2/015* (2006.01)
*B60N 2/02* (2006.01)
*B60N 2/14* (2006.01)

(52) U.S. Cl.
CPC ....... *B60N 2/01525* (2013.01); *B60N 2/0292* (2013.01); *B60N 2/14* (2013.01); *B60N 2002/022* (2013.01); *B60N 2002/0212* (2013.01); *B60N 2002/0216* (2013.01)

(58) Field of Classification Search
CPC .... B60N 2002/0212; B60N 2002/0216; B60N 2002/022
USPC ........................................... 296/65.01
See application file for complete search history.

(56) References Cited

U.S. PATENT DOCUMENTS

| 342,930 | A | * | 6/1886 | Raymond | B60B 33/0002 16/38 |
|---|---|---|---|---|---|
| 4,157,797 | A | * | 6/1979 | Fox | B64D 11/0696 296/65.05 |
| 5,474,311 | A | * | 12/1995 | Tyciak | B60N 2/01591 280/30 |
| 5,800,015 | A | * | 9/1998 | Tsuchiya | B60N 2/085 248/65 |
| 6,749,264 | B2 | * | 6/2004 | Jeong | B60N 2/01583 297/331 |
| 6,752,445 | B1 | * | 6/2004 | Koehler | H01R 13/629 296/65.01 |
| 2003/0132588 | A1 | * | 7/2003 | Senger | B60N 2/2851 280/30 |

* cited by examiner

*Primary Examiner* — Hilary L Gutman
(74) *Attorney, Agent, or Firm* — MCDONNELL BOEHNEN HULBERT & BERGHOFF LLP

(57) ABSTRACT

A moving and locking device for a seat and a personal mobility, which is installed in a bottom portion of a seat for a vehicle or a personal mobility, is provided with a floor panel of a vehicle interior in a structure in which rolling movement of the moving device and a locking coupling of the locking device are possible, is capable of freely moving the seat for a vehicle or the personal mobility to a desired position of the floor panel in the vehicle and firmly fixing the seat for a vehicle or the personal mobility.

10 Claims, 7 Drawing Sheets

MOVING AND LOCKING DEVICE FOR SEAT AND PERSONAL MOBILITY

CROSS REFERENCE TO RELATED APPLICATIONS

This application claims under 35 U.S.C. § 119(a) the benefit of priority to Korean Patent Application No. 10-2020-0125472 filed on Sep. 28, 2020, the entire contents of which are incorporated herein by reference.

BACKGROUND

(a) Technical Field

The present disclosure relates to a moving and locking device for a seat and a personal mobility vehicle, and more particularly to a moving and locking device for a seat and a personal mobility, which is capable of freely moving a seat for a vehicle or a personal mobility to a desired position of a floor panel in the vehicle and then firmly fixing the seat or the personal mobility.

(b) Background Art

Seats capable of performing linear movement and swiveling, and capable of being moved forward and backward toward desired positions or rotated in desired directions for the purpose of multi-party conference, conversation, relaxation, and viewing of outside scenery can be installed in autonomous vehicles.

To this end, a base frame of the seat is installed to be moved forward and backward on a rail formed on a floor panel, and a seat frame integrated with the seat is installed in the base frame to be capable of being swiveled.

Thus, the seat can be moved forward and backward to a position desired by a passenger or swiveled in a desired direction.

However, with only an operation of moving the seat forward and backward or swiveling the seat, there is a limitation in freely moving the seat to an interior position of the vehicle desired by the passenger.

Therefore, there is a need for a customized seat which allows an interior space of an autonomous vehicle to be utilized for various purposes such as an office, a living room, relaxation, and watching movies, and a mechanism capable of freely moving and fixing the customized seat to a desired interior position.

In addition, in consideration that an electric personal mobility for short-distance movement is becoming more common, there is a need for a mechanism capable of fixing a personal mobility at a desired position of a vehicle interior during long-distance movement and then utilizing the personal mobility as a seat.

SUMMARY

The present disclosure has been made in an effort to solve the above-described problems associated with prior art.

In one aspect, the present disclosure provides a moving and locking device for a seat and a personal mobility, which is installed in a bottom portion of a seat for a vehicle or a personal mobility, is provided with a floor panel of a vehicle interior in a structure in which rolling guide movement of the moving device and a locking coupling of the locking device are possible, is capable of freely moving the seat for a vehicle or the personal mobility to a desired position of the floor panel in the vehicle and firmly fixing the seat for a vehicle or the personal mobility.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides a moving and locking device for a seat and a personal mobility, which includes a floor panel in which a plurality of position guide grooves and a plurality of locking holes are formed, a moving device installed in a frame of a seat or a frame of a personal mobility and seated in a position guide groove selected from among the plurality of position guide grooves while rolled and moved along the floor panel, and a locking device installed in the frame to be movable upward and downward and detachably locked to and engaged with a locking hole selected from among the plurality of locking holes.

Preferably, the position guide grooves and the locking holes may form an alternating arrangement with each other, and may be formed on an upper surface of the floor panel at regular intervals in horizontal and vertical directions.

More preferably, a distance between a central portion of the position guide groove and a central portion of the locking hole may be set to be equal to a distance between a central portion of a roller of the moving device and a central portion of a lead screw of the locking device.

The moving device may include a support shaft inserted into and installed at positions in a bottom portion of the frame in all directions, a support bracket installed in a lower end portion of the support shaft, and a roller installed in the support bracket and configured to be rolled and moved along the floor panel to be seated in the position guide groove.

In addition, a guide hole into which an upper end portion of the support shaft is inserted may be formed in the frame, and a damping member in lockable contact with an upper surface portion of the frame around the guide hole may be attached to the upper end portion of the support shaft.

In addition, a spring which is elastically supported between a bottom surface of the frame and an upper surface of the support bracket may be inserted and arranged in an outer diameter portion of the support shaft.

The locking device may include a support plate installed in the frame, a motor installed in the support plate, and a lead screw engaged with a gearbox of the motor to be movable upward and downward and detachably locked to and engaged with the locking hole.

In addition, a press end brought into pressable contact with an upper surface of the gearbox may be integrally formed in an upper end portion of the lead screw, and a female thread portion for a screw engagement of the lead screw may be formed in an inner diameter portion of the locking hole.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
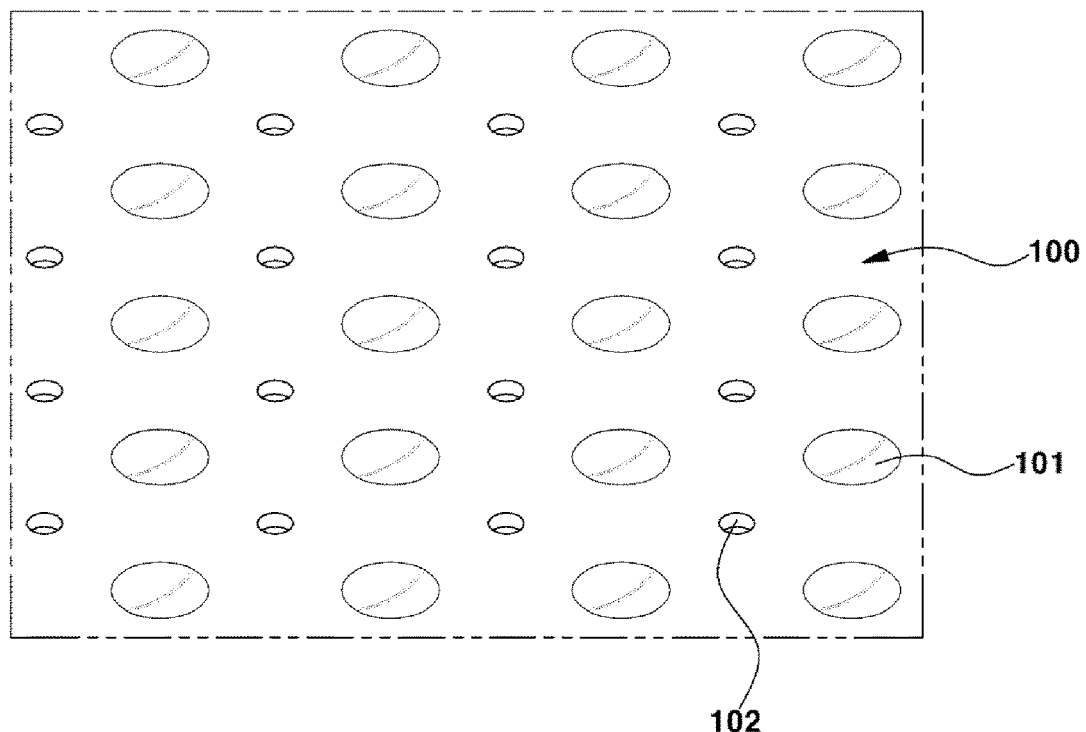
FIG. 1 is a perspective view illustrating a portion of a floor panel among components of a moving and locking device for a seat and a personal mobility according to the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings.

Figure 2:
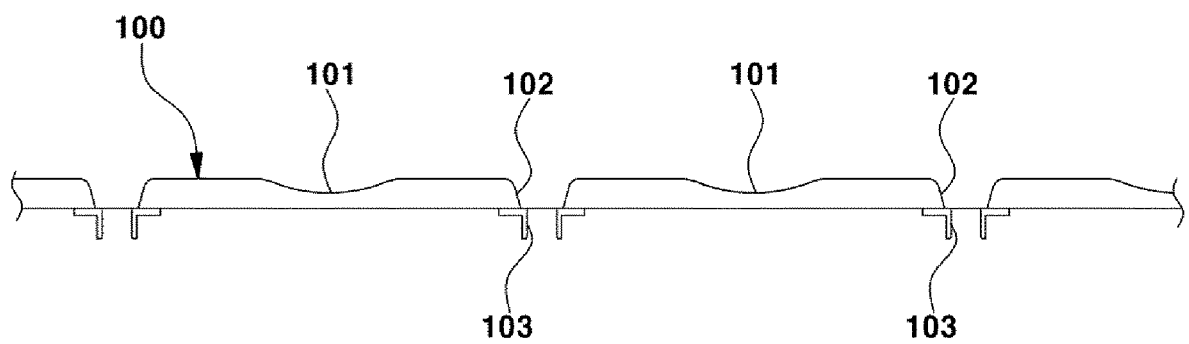
FIG. 2 is a cross-sectional view illustrating the portion of the floor panel among the components of a moving and locking device for a seat and a personal mobility according to the present disclosure.

FIGS. 1 and 2 illustrate a floor panel constituting an interior floor surface of a vehicle among components of a moving and locking device for a seat and a personal mobility according to the present disclosure.

As shown in FIG. 1, a plurality of position guide grooves 101 and locking holes 102 for guiding and fixing a moving position of a seat or a personal mobility are formed in a floor panel 100.

The position guide grooves 101 and the locking holes 102 may be formed on the floor panel 100 in an arrangement of various patterns.

For example, the position guide grooves 101 and the locking holes 102 are formed on an upper surface of the floor panel 100 at regular intervals in horizontal and vertical directions while forming an alternating arrangement with each other.

Thus, the locking holes 102 may be located in all directions of the position guide groove 101, and the position guide grooves 101 may be located in all directions of the locking hole 102.

Figure 3:
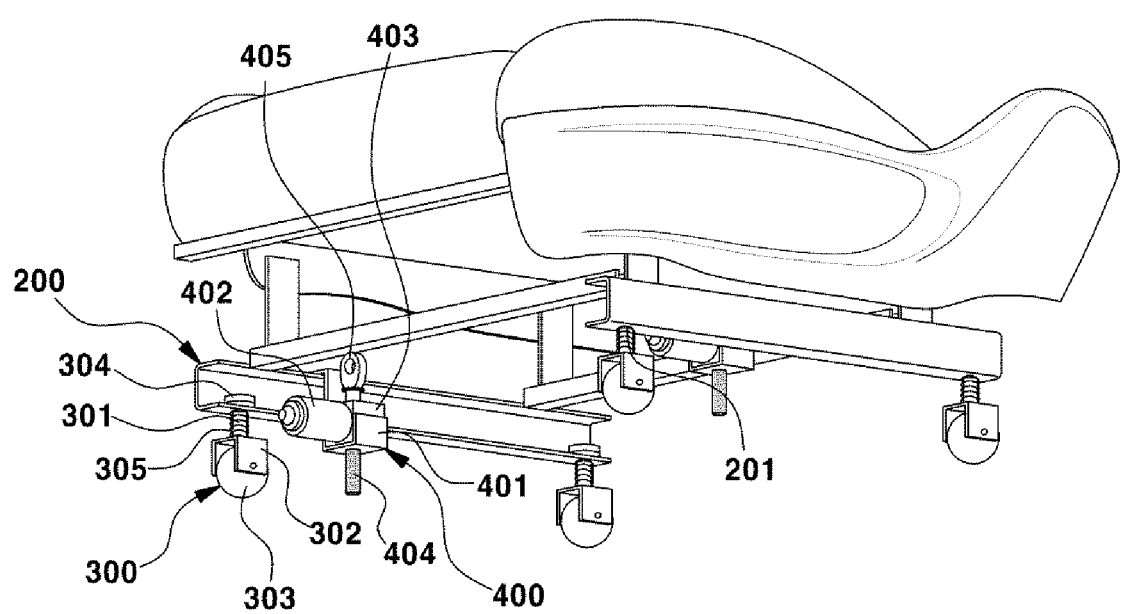
FIG. 3 is a perspective view illustrating an installation state of a moving device and a locking device among the components of the moving and locking device for a seat and a personal mobility according to the present disclosure.
Figure 4:
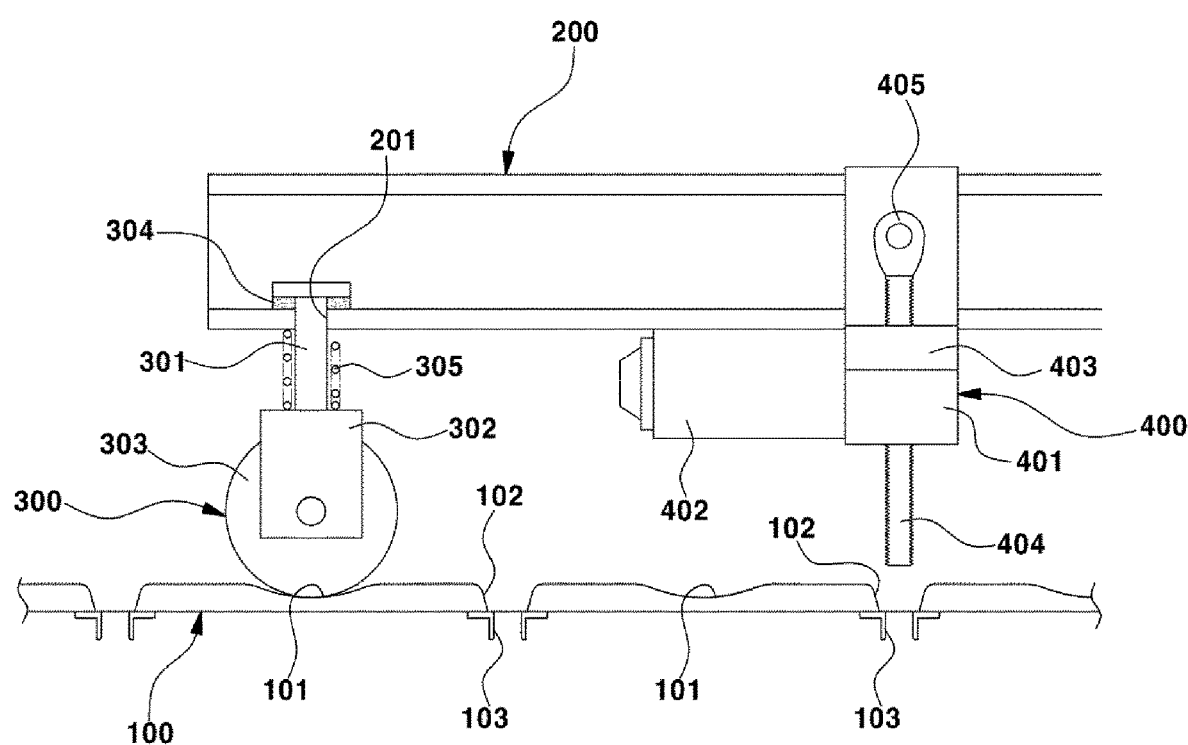
FIG. 4 is a cross-sectional view illustrating an unlocking state of the locking device among the components of the moving and locking device for a seat and a personal mobility according to the present disclosure.

FIGS. 3 and 4 illustrate a state in which a moving device and a locking device are installed in a bottom portion of a seat among components of the moving and locking device for a seat and a personal mobility according to the present disclosure.

As shown in FIGS. 3 and 4, a moving device 300 capable of rolling and freely moving a seat or a personal mobility to a desired position in a vehicle interior, and a locking device 400 capable of firmly fixing the seat or the personal mobility, which is moved to the desired position, to the floor panel 100 are installed in a frame 200 of a seat or a personal mobility.

The moving device 300 is installed in the frame 200 of the seat or the frame 200 of the personal mobility and provided in a structure of being rolled and moved along the floor panel 100 and seated and inserted into a position guide groove 101 selected from among the plurality of position guide grooves 101.

To this end, the moving device 300 includes a support shaft 301 inserted and installed at positions on a bottom portion of the frame 200 in all directions to be movable upward and downward, a support bracket 302 installed in a lower end portion of the support shaft 301, and a roller 303 rotatably installed in the support bracket 302 and inserted and seated in the position guide groove 101 while being rolled and moved along the floor panel 100.

In this case, a guide hole 201 into which an upper end portion of the support shaft 301 is inserted is formed in the frame 200, and thus the upper end portion of the support shaft 301 is inserted to be movable upward and downward through the guide hole 201 of the frame 200.

In addition, in order to prevent a separation phenomenon in which the support shaft 301 is released from the guide hole 201, a damping member 304 which is made of a rubber material and is lockably brought into contact with an upper surface portion of the frame 200 around the guide hole 201 is attached to the upper end portion of the support shaft 301.

Preferably, the roller 303 may be replaced with a ball-shaped roller which is rolled along the upper surface of the floor panel 100.

In a process in which the roller 303 is rolled and moved from one position guide groove 101 to another position guide groove 101 which are formed in the floor panel 100, it is preferable that the roller 303 is moved upward when crossing the upper surface of the floor panel 100 having a height that is higher than a height of the position guide groove 101, and the roller 303 is moved downward when reaching the position guide groove 101.

To this end, a spring 305 which is elastically supported between a bottom surface of the frame 200 and an upper surface of the support bracket 302 is inserted into an outer diameter portion of the support shaft 301.

Thus, when the roller 303 crosses the upper surface of the floor panel 100 having the height that is higher than the height of the position guide groove 101, the support bracket 302 may be moved upward together with the roller 303 to compress the spring 305 and, simultaneously, the support shaft 301 may be moved upward through the guide hole 201 of the frame 200. On the other hand, when the roller 303 reaches a desired position guide groove 101, the roller 303 may be moved downward together with the support bracket 302 and the support shaft 301 due to an elastic restoring force of the spring 305 to be easily inserted and seated in the desired position guide groove 101.

As described above, when the roller 303 is moved to the desired position guide groove 101 among the plurality of position guide grooves 101, the seat or the personal mobility becomes a state of being freely moved to a desired position of the floor panel 100.

When the seat or the personal mobility is moved to the desired position of the floor panel 100, the seat or the personal mobility may be firmly fixed by the locking device 400 for safety during traveling.

The locking device 400 is movable upward and downward in the frame 200 at a position spaced a predetermined distance from the moving device 300, and is provided in a structure of being detachably locked to and engaged with a selected locking hole 102 among the plurality of locking holes 102.

To this end, the locking device 400 includes a support plate 401 installed in the frame 200, a motor 402 having a gearbox 403 installed in the support plate 401, and a lead screw 404 engaged with the gearbox 403 of the motor 402 to be movable upward and downward and detachably locked to and engaged with the locking hole 102 of the floor panel 100.

In addition, a press end 405 in pressable contact with an upper surface of the gearbox 403 is integrally formed in an upper end portion of the lead screw 404.

In addition, a female thread portion 103 for allowing a screw engagement due to a rotation of the lead screw 404 is formed in an inner diameter portion of the locking hole 102 so as to prevent a lower end portion of the lead screw 404 from being released from the locking hole 102 when the lower end portion of the lead screw 404 is locked to and engaged with the locking hole 102.

Alternatively, as a part for locking and engaging the lower end portion of the lead screw 404 with the locking hole 102, a structure such as a clip or a hook may be used, and a fixing structure using an electromagnetic force or a pneumatic pressure may be used.

Meanwhile, in order to accurately ensure an operation in which the lead screw 404 of the locking device 400 is inserted into and locked in the locking hole 102 after the roller 303 of the moving device 300 is inserted and seated in the position guide groove 101 formed in the floor panel 100, a distance between a central portion of the position guide groove 101 and a central portion of the locking hole 102 should be set to be equal to a distance between a central portion of the roller 303 of the moving device 300 and a central portion of the lead screw 404 of the locking device 400.

Thus, in the process of manufacturing the floor panel 100 and installing the moving device 300 and the locking device 400 in the frame 200, the distance between the central portion of the position guide groove 101 and the central portion of the locking hole 102 may be equally matched to the distance between the central portion of the roller 303 of the moving device 300 and the central portion of the lead screw 404 of the locking device 400.

Here, an operation flow of the moving and locking device for a seat and a personal mobility, which is made of the above configuration, according to the present disclosure, will be described below with reference to FIGS. 4 to 7.

Referring to FIG. 4, when the roller 303 is inserted and seated in the position guide groove 101 of the floor panel 100, and the lead screw 404 of the locking device 400 is in an unlocked state of being released from the locking hole 102 of the floor panel 100, the seat or the personal mobility may be freely moved to a desired position along the floor panel 100.

To this end, when a user pushes or rotates the seat or the personal mobility in a desired direction and to a desired position, the roller 303 is rolled along the upper surface of the floor panel 100 and moved to a desired position guide groove 101 among the plurality of position guide grooves 101 to be inserted and seated in the desired position guide groove 101.

In this case, as described above, when the roller 303 crosses the upper surface of the floor panel 100 having the height that is higher than the height of the position guide groove 101, the support bracket 302 may be moved upward together with the roller 303 to compress the spring 305 and, simultaneously, the support shaft 301 may be moved upward through the guide hole 201 of the frame 200. On the other hand, when the roller 303 reaches a desired position guide groove 101, the roller 303 may be moved downward together with the support bracket 302 and the support shaft 301 due to an elastic restoring force of the spring 305 to be easily inserted and seated in the desired position guide groove 101.

As described above, after the roller 303 is moved to the desired position guide groove 101, that is, the seat or the personal mobility is moved to the desired position of the floor panel 100, the seat or the personal mobility may be firmly fixed due to driving of the locking device 400 for safety during traveling.

Figure 5:
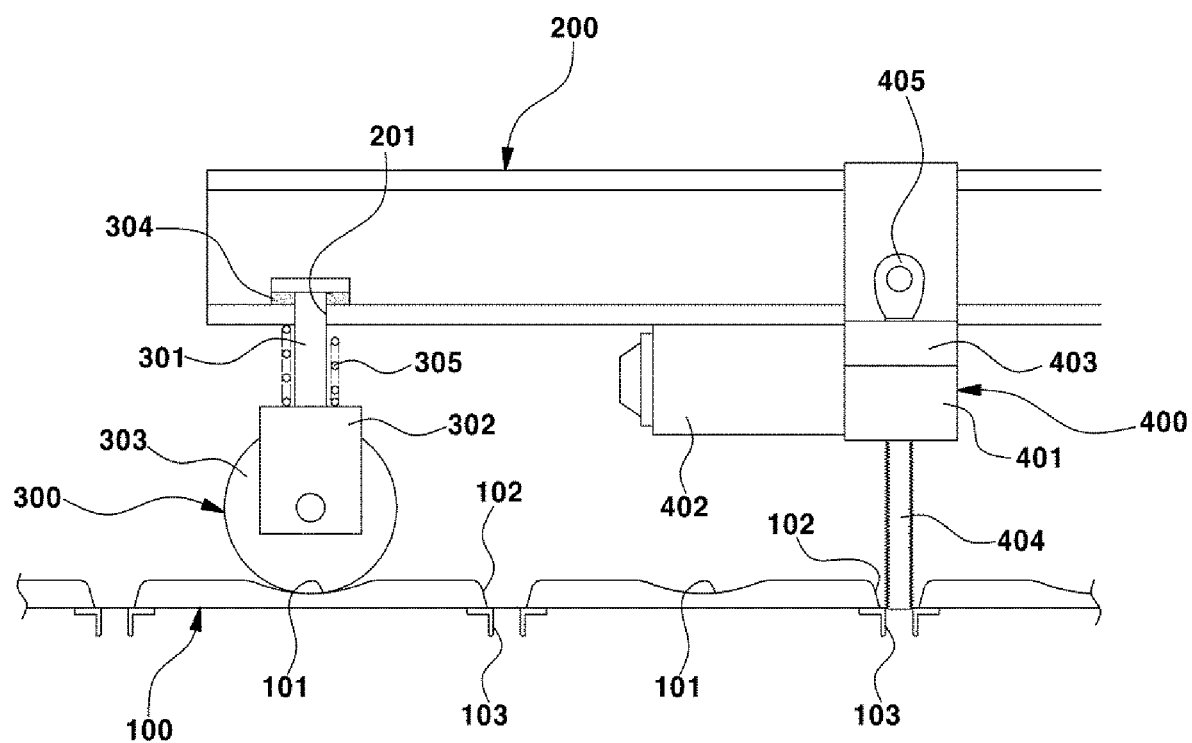
FIG. 5 is a cross-sectional view illustrating a state in which a lead screw of the locking device is moved downward for locking among the components of the moving and locking device for a seat and a personal mobility according to the present disclosure.

To this end, when the motor 402 of the locking device 400 is driven, a rotational force of the motor 402 in one direction is transmitted to the lead screw 404 through an output gear of the gearbox 403 so that, as shown in FIG. 5, the lead screw 404 is rotated to be moved downward.

Figure 6:
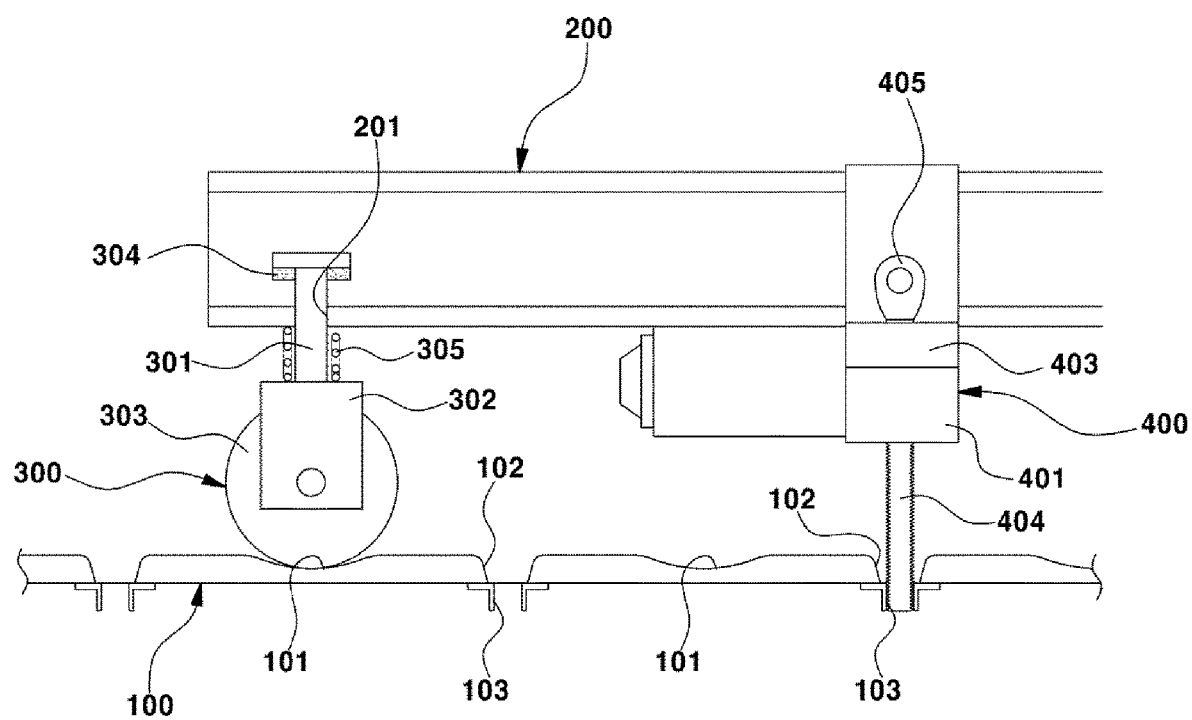
FIG. 6 is a cross-sectional view illustrating a locking state of the locking device among the components of the moving and locking device for a seat and a personal mobility according to the present disclosure.
Figure 7:
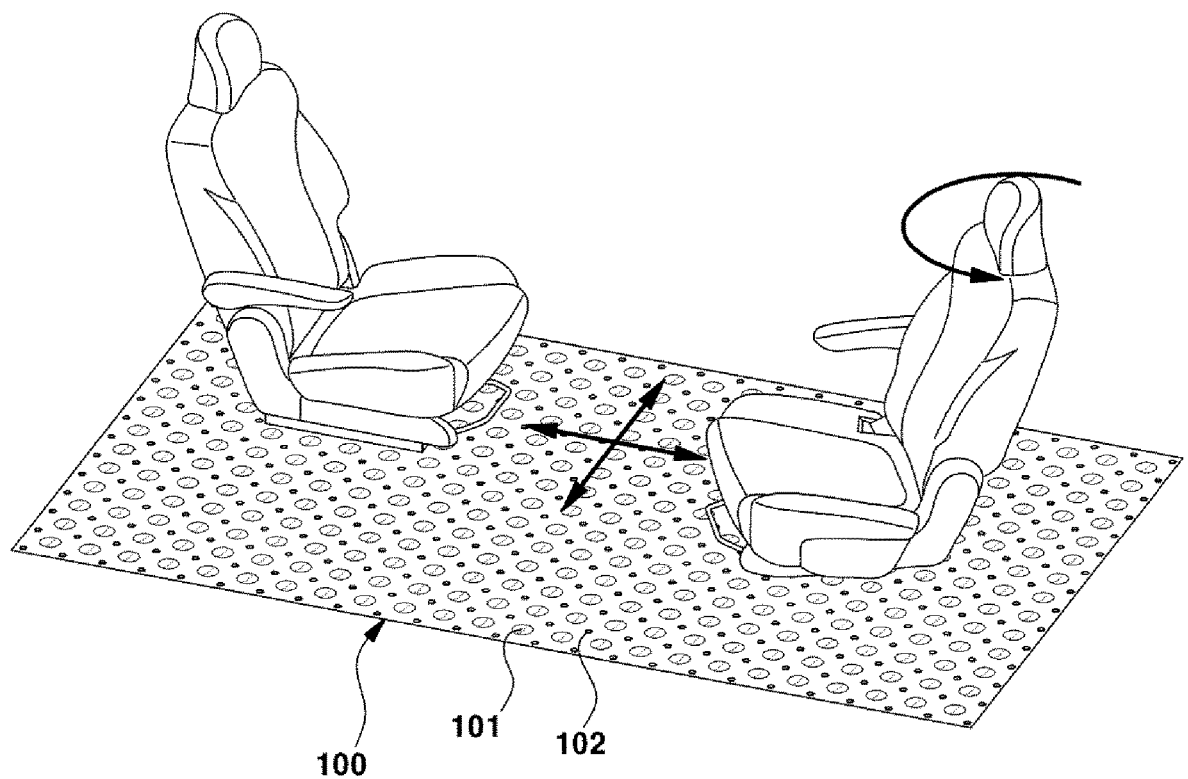
FIG. 7 is a perspective view illustrating an example in which a seat for a vehicle including the moving and locking device for a seat and a personal mobility according to the present disclosure is arranged on the floor panel.

Subsequently, as shown in FIG. 6, the lead screw 404 is continuously moved downward to be screw-engaged with the locking hole 102 of the floor panel 100, thereby becoming in a state in which the support plate 401 in which the gearbox 403 is installed and the frame 200 in which the support plate 401 is installed are constrained and, simultaneously, the seat or the personal mobility, which includes the frame 200, is constrained and fixed.

In this case, as shown in FIG. 6, when the lead screw 404 is moved downward to be locked in and engaged with the locking hole 102 of the floor panel 100, the press end 405 of the lead screw 404 presses the upper surface of the gearbox 403 so that the support plate 401 in which the gearbox 403 is installed and the frame 200 in which the support plate 401 is installed compress the spring 305 to be moved together and, simultaneously, the seat or the personal mobility including the frame 200 is also moved downward.

As described above, as shown in FIG. 7, the seat for a vehicle or the personal mobility is freely moved to a desired position in the vehicle interior using the moving device 300 and then firmly fixed to the floor panel 100 using the locking device 400 so that the seat or the personal mobility may be freely adjusted and arranged in a desired direction and to a desired position in an interior space of an autonomous vehicle according to a desired purpose.

Meanwhile, in the above described embodiment, the operation of moving the lead screw 404 upward has been described as being performed in an electrical manner by the motor 402 and the gearbox 403, but the operation of moving the lead screw 404 upward may also be performed in a manual manner.

To this end, a lever 410 for a manual rotation operation may be further installed in a head portion of the lead screw 404.

Figure 8:
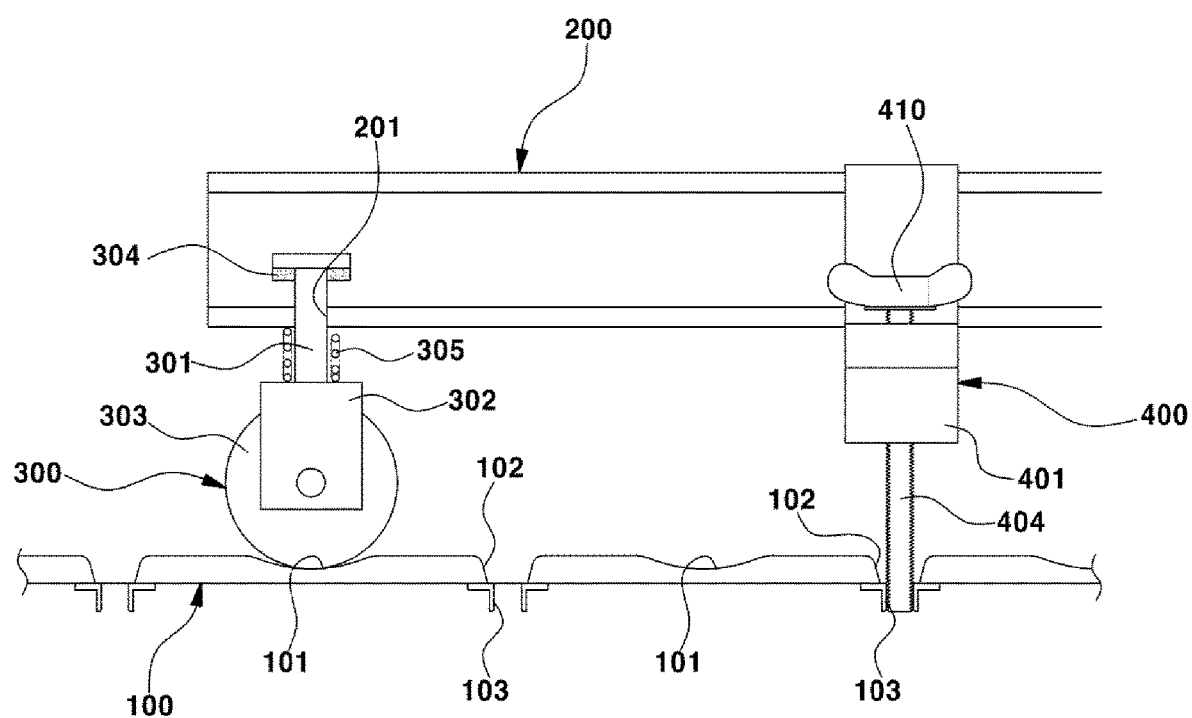
FIG. 8 is a cross-sectional view illustrating a state in which a manual lever is installed in the lead screw of the locking device among the components of the moving and locking device for a seat and a personal mobility according to the present disclosure.

More specifically, as shown in FIG. 8, by excluding the motor 402 and the gearbox 403, the lever 410 capable of being directly rotated by a user may be formed in the head portion of the lead screw 404.

Thus, when the user directly holds and rotates the lever 410, a rotational force of the lever 410 is transmitted to the lead screw 404 so that the lead screw 404 may be rotated and moved downward to fix the seat or the personal mobility.

In addition, in addition to the lead screw method, a structure in which a clip or hook structure is detachably locked to and engaged with the floor panel 100, and a locking structure using an electromagnetic force or a hydraulic pressure may be applied as the locking device 400.

The present disclosure provides the following effects through the above-described problem solving means.

First, a seat for a vehicle or a personal mobility can be freely moved to a desired position in a vehicle interior using a moving device.

Second, the seat or the personal mobility, which is moved to the desired position in the vehicle interior, can be firmly fixed to a floor panel using a locking device.

Third, since the seat or the personal mobility can be freely moved to a desired position of the floor panel in a vehicle using the moving device and the locking device and then firmly fixed to the desired position thereof, a position of the seat can be freely adjusted and arranged in an interior space of an autonomous vehicle according to a desired purpose.

Fourth, since the seat or the personal mobility can be freely moved to a desired position of the floor panel in a vehicle using the moving device and the locking device and then firmly fixed to the desired position thereof, it is possible to achieve reduction in weight and manufacturing cost by excluding the existing complicated seat forward and backward mechanism and a seat swiveling mechanism.

The effects of the present disclosure are not limited to the above-described effects. It should be understood that the effects of the present disclosure include all effects which can be inferred from the above description.

While the embodiments of the present disclosure have been described with reference to the accompanying drawings, those skilled in the art can understand that the present disclosure can be implemented in other specific forms without departing from the technical spirit or the necessary features of the present disclosure. Therefore, it should be understood that the above-described embodiments are not restrictive but illustrative in all aspects.

The invention claimed is:

1. A moving and locking system for a seat and a personal mobility vehicle, comprising:
    a floor panel having a plurality of position guide grooves and a plurality of locking holes each formed in rows and columns on the floor panel;
    a moving device installed in a frame of the seat or a frame of the personal mobility vehicle, the moving device being seated in one of the position guide grooves selected from among the plurality of position guide grooves by being rolled and moved along the floor panel; and
    a locking device installed in the frame to be movable upward and downward and detachably locked to and engaged with one of the locking holes selected from among the plurality of locking holes;
    wherein the rows and columns of the plurality of position guide grooves and the rows and columns of the plurality of locking holes are formed on an upper surface of the floor panel at regular intervals; and
    wherein each row of the plurality of position guide grooves is offset with an adjacent row of the plurality of locking holes, and each column of the plurality of position guide grooves is offset with an adjacent column of the plurality of locking holes.

2. The moving and locking system of claim 1, wherein a distance between a central portion of the position guide groove and a central portion of the locking hole is equal to a distance between a central portion of a roller of the moving device and a central portion of a lead screw of the locking device.

3. The moving and locking system of claim 1, wherein the moving device includes:
    a support shaft inserted into and installed at positions in a bottom portion of the frame;
    a support bracket installed in a lower end portion of the support shaft; and
    a roller installed in the support bracket and configured to be rolled and moved along the floor panel to be seated in each of the plurality of the position guide grooves.

4. The moving and locking system of claim 3, wherein a guide hole into which an upper end portion of the support shaft is inserted is formed in the frame.

5. The moving and locking system of claim 4, wherein a damping member in contact with an upper surface portion of the frame around the guide hole is attached to the upper end portion of the support shaft.

6. The moving and locking system of claim 3, wherein a spring which is elastically supported between a bottom surface of the frame and an upper surface of the support bracket is inserted and arranged in an outer diameter portion of the support shaft.

7. The moving and locking system of claim 1, wherein the locking device includes:
    a support plate installed in the frame;
    a motor installed in the support plate; and
    a lead screw engaged with a gearbox of the motor to be movable upward and downward and detachably locked to and engaged with the locking hole.

8. The moving and locking system of claim 7, wherein a press end brought into pressable contact with an upper surface of the gearbox is integrally formed in an upper end portion of the lead screw.

9. The moving and locking system of claim 8, wherein a female thread portion for engagement with the lead screw is formed in an inner diameter portion of the locking hole.

10. The moving and locking system of claim 2, wherein a lever for a manual rotation operation is further installed in a head portion of the lead screw.

* * * * *